US008032424B1

(12) United States Patent
Fastenau et al.

(10) Patent No.: US 8,032,424 B1
(45) Date of Patent: *Oct. 4, 2011

(54) METHOD, SYSTEM, AND STORAGE MEDIUM FOR VIEWING COMMODITY INFORMATION

(75) Inventors: Lee Fastenau, San Antonio, TX (US); Anthony R. Noriega, San Antonio, TX (US); James Reed, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 1182 days.

This patent is subject to a terminal disclaimer.

(21) Appl. No.: 11/319,150

(22) Filed: Dec. 27, 2005

(51) Int. Cl.
*G06Q 30/00* (2006.01)
*G06F 17/30* (2006.01)

(52) U.S. Cl. ............. 705/26.61; 705/26.1; 705/26.62; 705/26.63; 705/26.7

(58) Field of Classification Search ....... 705/1, 26–27.2; 370/338
See application file for complete search history.

(56) References Cited

U.S. PATENT DOCUMENTS

| | | | |
|---|---|---|---|
| 6,609,106 B1 * | 8/2003 | Robertson ..................... 705/26 |
| 7,212,991 B2 * | 5/2007 | Chowdhary et al. ............ 705/26 |
| 7,693,751 B2 * | 4/2010 | Aronson ........................ 705/26 |
| 7,756,143 B2 * | 7/2010 | Buchhop et al. ............. 370/401 |
| 2001/0037373 A1 | 11/2001 | Cambridge |
| 2002/0007322 A1 | 1/2002 | Stromberg |
| 2004/0003266 A1 | 1/2004 | Moshir et al. |
| 2004/0044582 A1 * | 3/2004 | Chowdhary et al. ............ 705/26 |
| 2005/0108096 A1 | 5/2005 | Burger et al. |
| 2005/0160084 A1 * | 7/2005 | Barrett ............................ 707/3 |
| 2005/0261989 A1 * | 11/2005 | Vadon et al. .................... 705/27 |
| 2006/0020524 A1 * | 1/2006 | Yeko et al. ...................... 705/27 |
| 2006/0224406 A1 * | 10/2006 | Leon et al. ........................ 705/1 |
| 2006/0265288 A1 * | 11/2006 | Aronson ......................... 705/26 |
| 2007/0053333 A1 * | 3/2007 | Pragada ........................ 370/338 |
| 2007/0250398 A1 * | 10/2007 | Chowdhary et al. ............ 705/26 |
| 2008/0154633 A1 | 6/2008 | Ishibashi et al. |
| 2009/0259935 A1 * | 10/2009 | Kramer et al. ................ 715/234 |

OTHER PUBLICATIONS www.adiamondisforever.com. Aug. 8, 2003. [recovered from archive.org on Jul. 21, 2009].*
www.cnet.com. Feb. 14, 2005. recovered from Archive.org on Apr. 13, 2010.*
www.circuitcity.com. Jun. 9, 2003. recovered from Archive.org on Apr. 13, 2010.*
www.cnet.com. Feb. 14, 2005. recovered from Archive.org on Apr. 13, 2010, updated from www.Archvie.org on Oct. 6, 2010.*
Adiamor; Diamonds and Fine Jewelry: Adiamor Interactive Diamond Search, "Design Your Ring," http://www.adiamor.com/advanced_diamond_search.aspx, downloaded Aug. 3, 2006, 3 pages.
Blue Nile: Education, Guidance, Diamonds and Fine Jewelry, "Free FedEx® & 30-day returns on all engagement rings," http://www.bluenile.com/diamond_search.asp?track=dss&filter_id=0, downloaded Aug. 3, 2006, 2 pages.
EngagementRingsDirect.Com; Basic and Premium Diamond Collection, "Basic Diamond Search," http://www.engagementringsdirect.com/diamonds.php, 2004, downloaded Aug. 3, 2006, 1 page.
Zales, http://www.zales.com/search/index.jsp?categoryId=2123971& cp=2071132&f=PAD%2FStone+T, 2006, downloaded Aug. 3, 2006, 2 pages.

* cited by examiner

*Primary Examiner* — Will Allen
(74) *Attorney, Agent, or Firm* — Brooks, Cameron & Huebsch PLLC (57) ABSTRACT

A request for information relating to a commodity is sent to a server using a client computer. The requested commodity information is received at the client computer and rendered on a display. A client action with respect to the commodity information is detected, and, using the client computer, a determination is made whether communication with the server is required to respond to the client action and, if the communication is not necessary, responding to the client action without communicating with the server regarding the response.

33 Claims, 10 Drawing Sheets

METHOD, SYSTEM, AND STORAGE MEDIUM FOR VIEWING COMMODITY INFORMATION

CROSS REFERENCE TO RELATED APPLICATIONS

This application is related by subject matter to the inventions disclosed in the following commonly assigned applications: Ser. No. 11/318,735, filed on Dec. 27, 2005; Ser. No. 11/318,737, filed on Dec. 27, 2005; and Ser. No. 11/319,105, filed on Dec. 27, 2005. The disclosure of each application is incorporated by reference herein in its entirety.

BACKGROUND

As the use of the Internet to purchase various commodities becomes more and more common, merchants must find ways to sell such commodities online if they wish to remain competitive. Some commodities, however, are difficult to sell online because of consumer resistance, the nature of the commodity itself, or a combination of factors. For example, diamonds have historically been a commodity that is purchased in-person because of their high cost and unique nature. But purchasing a diamond in person has its own drawbacks.

Most conventional "bricks and mortar" diamond retailers cannot afford to maintain a significant number of diamonds in stock because of the high cost associated with purchasing, securely storing and insuring the diamonds. Each diamond varies in terms of shape, weight, color, clarity and cut. As a result, it is difficult for a consumer to compare prices when selecting diamonds in-person because it is highly unlikely that stores in the consumer's area will have two diamonds that are similar enough in terms of these characteristics to enable a suitable comparison. If a consumer truly wanted to compare prices of two very similar diamonds, the consumer would probably have to travel to many different stores in a wide area before finding two diamonds that are both similar enough for a reasonable price comparison and match the consumer's desired characteristics.

Therefore, for purposes of price comparisons and selection, it would be beneficial for a consumer to shop for diamonds—or any type of commodity—online. Consumers, however, are still likely to be hesitant to purchase a diamond online because it is difficult to visualize what a diamond, if purchased loose, will look like in a setting. For example, a ring setting may make a diamond look larger or smaller depending on the width of the band or other factors. A diamond merchant that wishes to conduct business online may attempt to provide a picture of each diamond so a consumer can see what the diamond looks like. This would involve taking a picture of every diamond in inventory in some standardized manner and then storing the picture in memory. When a consumer requests to see the picture, the merchant's server would have to send the picture to the consumer's computer. If the consumer wishes to compare a number of diamonds, numerous pictures would have to be sent to the consumer's computer. Such a mechanism for illustrating the diamond's appearance is costly in terms of labor to take the pictures, storage space and bandwidth. And, in any event, such effort may not be warranted because consumers usually just want to have an idea of what a diamond looks like, and seeing a picture of the exact diamond is unnecessary.

In addition, a server that hosts a merchant website may be a secure server, with the attendant security firewalls and other protective features. While these protective features help to ensure a secure Internet session with a consumer, the features slow down the process of providing information to a consumer because all of the security processes that must take place. Likewise, the client may have firewall or other protective features that also slow down the process of receiving information. Even if the server is not a secure server, the high volume of Internet traffic many servers experience dictates that the number of times a consumer computer has to access the server should be minimized.

SUMMARY

In view of the above shortcomings and drawbacks, computer-readable media, methods, software applications, computers and servers for requesting and/or providing commodity information are provided. In one such method, a request for information relating to a commodity is sent to a server using a client computer. The requested commodity information is received at the client computer and rendered on a display. A client action with respect to the commodity information is detected, and, using the client computer, a determination is made whether communication with the server is required to respond to the client action and, if the communication is not necessary, responding to the client action without communicating with the server regarding the response.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing summary, as well as the following detailed description, is better understood when read in conjunction with the appended drawings. For the purpose of illustrating the claimed subject matter, there is shown in the drawings example constructions of various embodiments; however, embodiments are not limited to the specific methods and instrumentalities disclosed. In the drawings:

FIGS. 3-4B are flowcharts illustrating example methods according to one embodiment of the invention; and FIGS. 5-8B are illustrations of an example user interface according to one embodiment of the invention.

DETAILED DESCRIPTION

The subject matter of the described embodiments is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1:
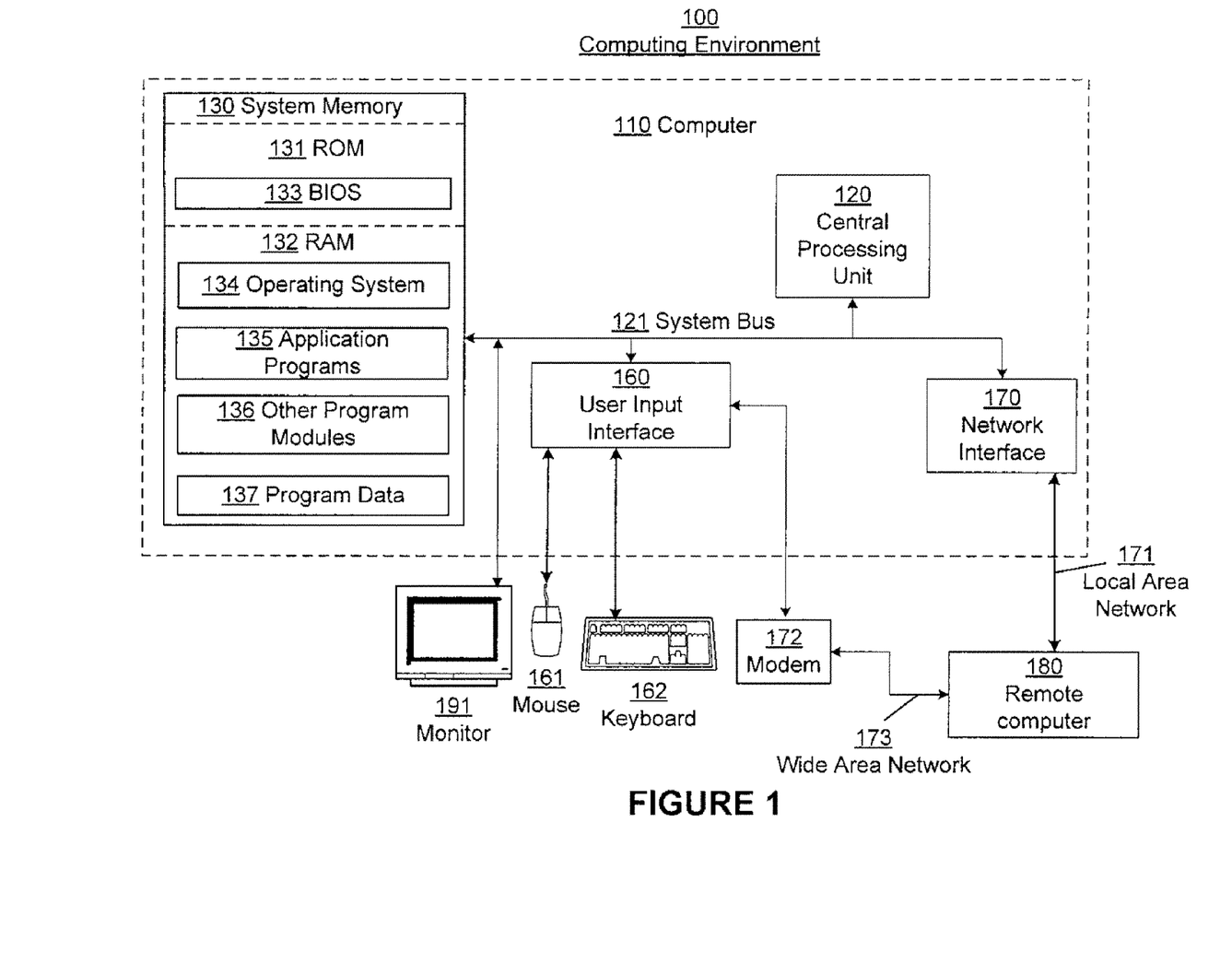
FIG. 1 illustrates an example computing environment in which aspects of one embodiment may be implemented.

FIG. 1 depicts an example computing environment 100 in which an example embodiment may be implemented. Computing environment 100 may include computer 110, monitor 191 and other input or output devices such as mouse 161, keyboard 162 and modem 172. Computers and computing environments such as computer 110 and computing environment 100 are known to those skilled in the art and thus are briefly described here.

An example system for implementing an embodiment includes a general purpose computing device in the form of computer 110. Components of computer 110 may include central processing unit 120, system memory 130 and system bus 121 that couples various system components including the system memory to processing unit 120.

System memory 130 may include computer storage media in the form of volatile and/or nonvolatile memory such as ROM 131 and RAM 132. A basic input/output system 133 (BIOS) containing the basic routines that help to transfer information between elements within computer 110, such as during start-up, may be stored in ROM 131. RAM 132 typically contains data and/or program modules that are immediately accessible to and/or presently being operated on by central processing unit 120. System memory 130 additionally may include, for example, operating system 134, application programs 135, other program modules 136 and program data 137.

Embodiments may be implemented in computing environment 100 in the form of any of a variety of computer readable media. Computer readable media can be any media that can be accessed by computer 110, including both volatile and nonvolatile, removable and non-removable media.

Computer 110 may operate in a networked environment using logical connections to one or more remote computers, such as remote computer 180. Remote computer 180 may be a personal computer, a server, a router, a network PC, a peer device or other common network node, and typically includes many or all of the elements described above relative to computer 110. The logical connections depicted in FIG. 1 include local area network (LAN) 171 and wide area network (WAN) 173, but may also include other networks. Such networking environments may be common in offices, enterprise-wide computer networks, intranets, and the Internet.

When used in a LAN networking environment, computer 110 may be connected to LAN 171 through network interface 170. When used in a WAN 173 networking environment, computer 110 may include modem 172 for establishing communications over WAN 173, such as the Internet. Modem 172 may be connected to system bus 121 via user input interface 160, or other appropriate mechanism.

Computer 110 or other client device can be deployed as part of a computer network. In this regard, various embodiments pertain to any computer system having any number of memory or storage units, and any number of applications and processes occurring across any number of storage units or volumes. An embodiment may apply to an environment with server computers and client computers deployed in a network environment, having remote or local storage. An embodiment may also apply to a standalone computing device, having programming language functionality, interpretation and execution capabilities.

Figure 2:
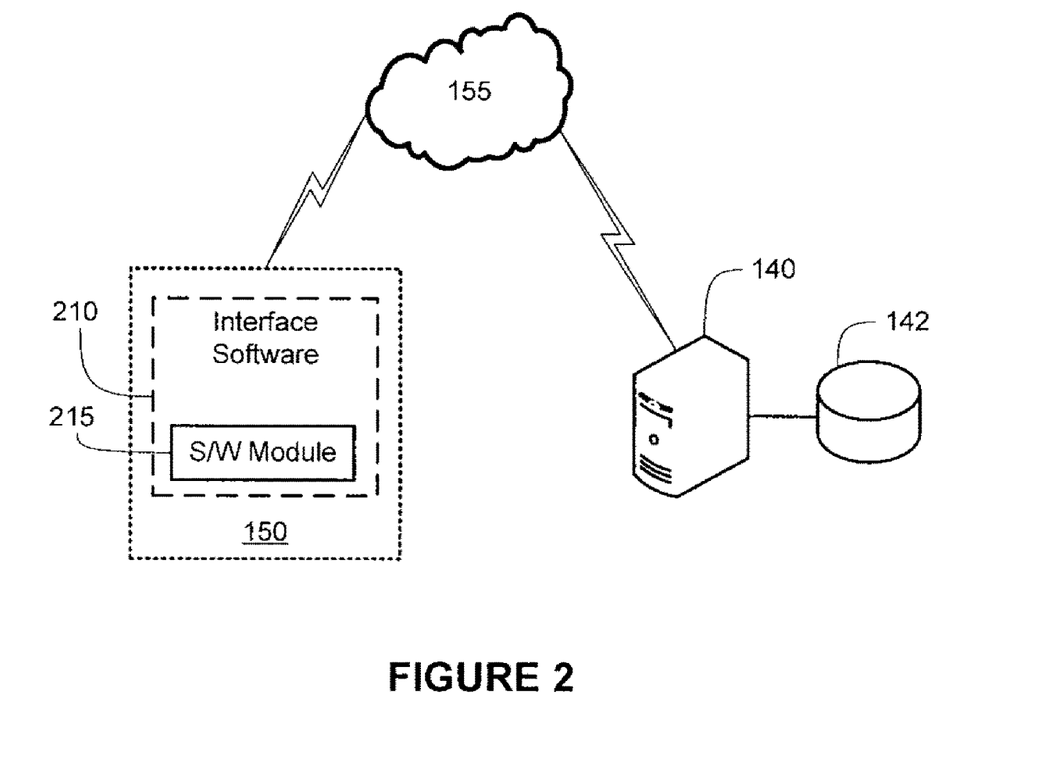
FIG. 2 illustrates an example computer network in which aspects of one embodiment may be implemented.

FIG. 2 illustrates an example computer network in which aspects of one embodiment may be implemented. The example network of FIG. 2 includes client computer 150, which may be configured as computer 110 discussed above in connection with FIG. 1. In an embodiment, client computer 150 is in operative communication with server 140 by way of network 155, which may be a LAN, WAN, the Internet or the like. Server 140 may be a remote computer 180 as discussed above in connection with FIG. 1.

Client computer 150 may have any number or type of subsystems that may execute interface software 210 such as, for example, a web browser or the like. Software module 215 is also executed by client computer 150 (or one or more subsystems of computer 150) and is in operative communication with interface software 210. In one embodiment, software module 215 is an integral part of interface software 210, while in other embodiments software module 215 may be a separate application, API, plug-in, software component, etc. In addition, software module 215 may be an instantiated object class provided by server 140, as will be discussed below in connection with step 303 of FIG. 3. For example, upon receiving a client computer 150 request to access data, server 140 may send software module 215 to client computer 150 as part of a website or the like. In one embodiment, software module 215 may communicate asynchronously with server 140.

In an embodiment, server 140 is associated with a business entity, such as an online merchant or the like, with which a user of client computer 150, such as a consumer, does business. Such an association does not necessarily mean that the merchant operates and/or maintains server 140, although such an arrangement would be consistent with an embodiment. For example, in an alternative embodiment, the merchant may have a relationship with a web hosting or other type of entity that actually operates server 140. Any such arrangement is contemplated by an embodiment. Once communication is established between client computer 150 and server 140, regardless of the actual communication method employed, server 140 may provide information from data repository 142. Data repository 142 may be an integral part of server 140 (e.g., an internal hard drive or the like), or may be a storage medium that is accessible to server 140 (e.g., a network drive or the like).

In an embodiment, data repository 142 may store information relating to a plurality of commodities for sale. Such commodities need not be owned by the merchant associated with server 140. For example, the merchant may have a "virtual inventory," whereby one or more suppliers, wholesalers or the like may provide information relating to their inventories. The merchant may have a contractual or other type of relationship such that the merchant can purchase a particular commodity if that commodity has been selected for purchase by a consumer. Thus, it appears to a consumer that the merchant has a large inventory, which includes commodities owned by the merchant as well as commodities that may be acquired by the merchant. The merchant may or may not provide an indication of which commodities are actually owned by the merchant. In one embodiment, no indication is given. It will be appreciated that such an arrangement may reduce the merchant's overhead costs involved with storing, securing and insuring the commodities. When the commodity is expensive such as, for example, a diamond, these overhead costs may be very large.

Figure 3:
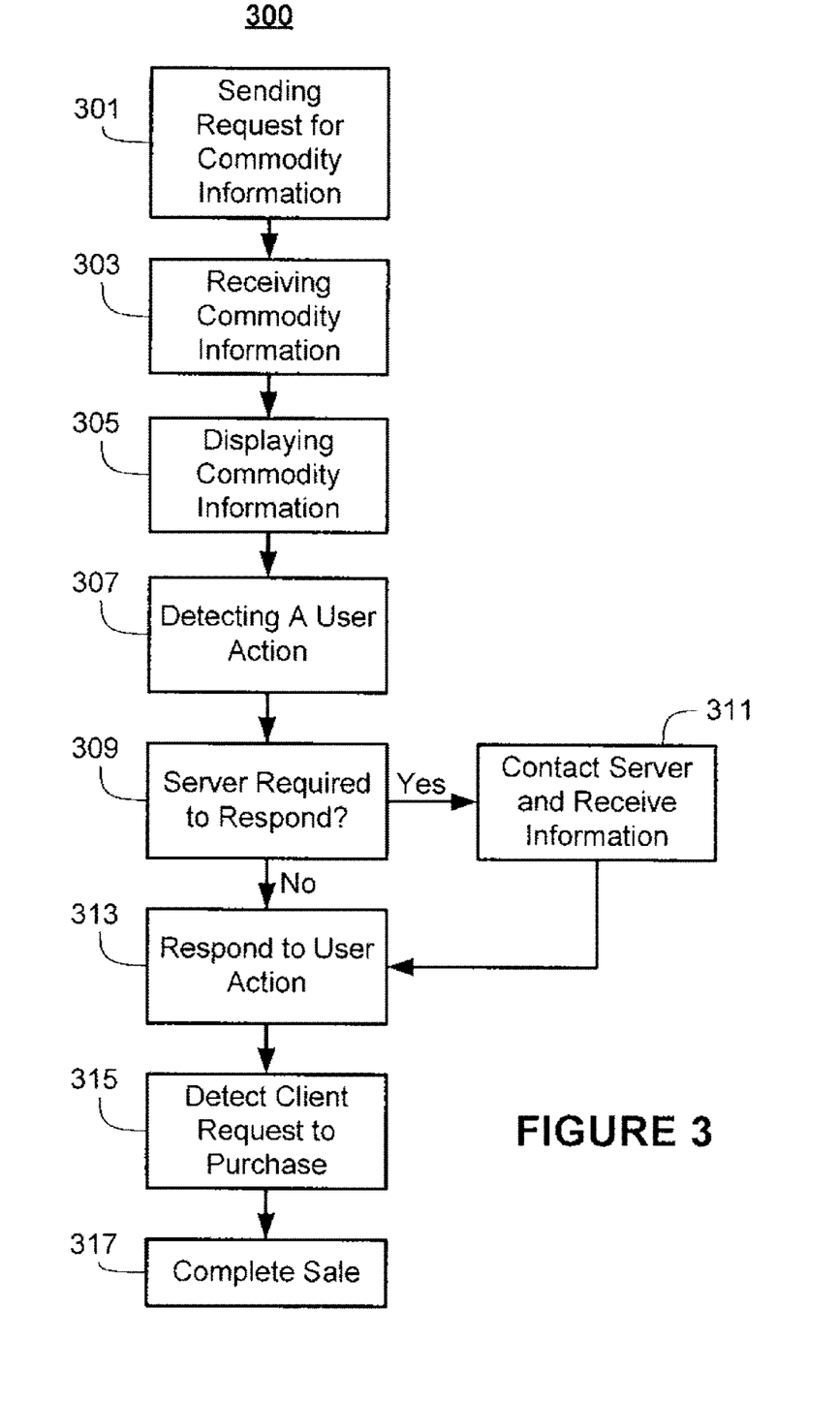
Figure 4A:
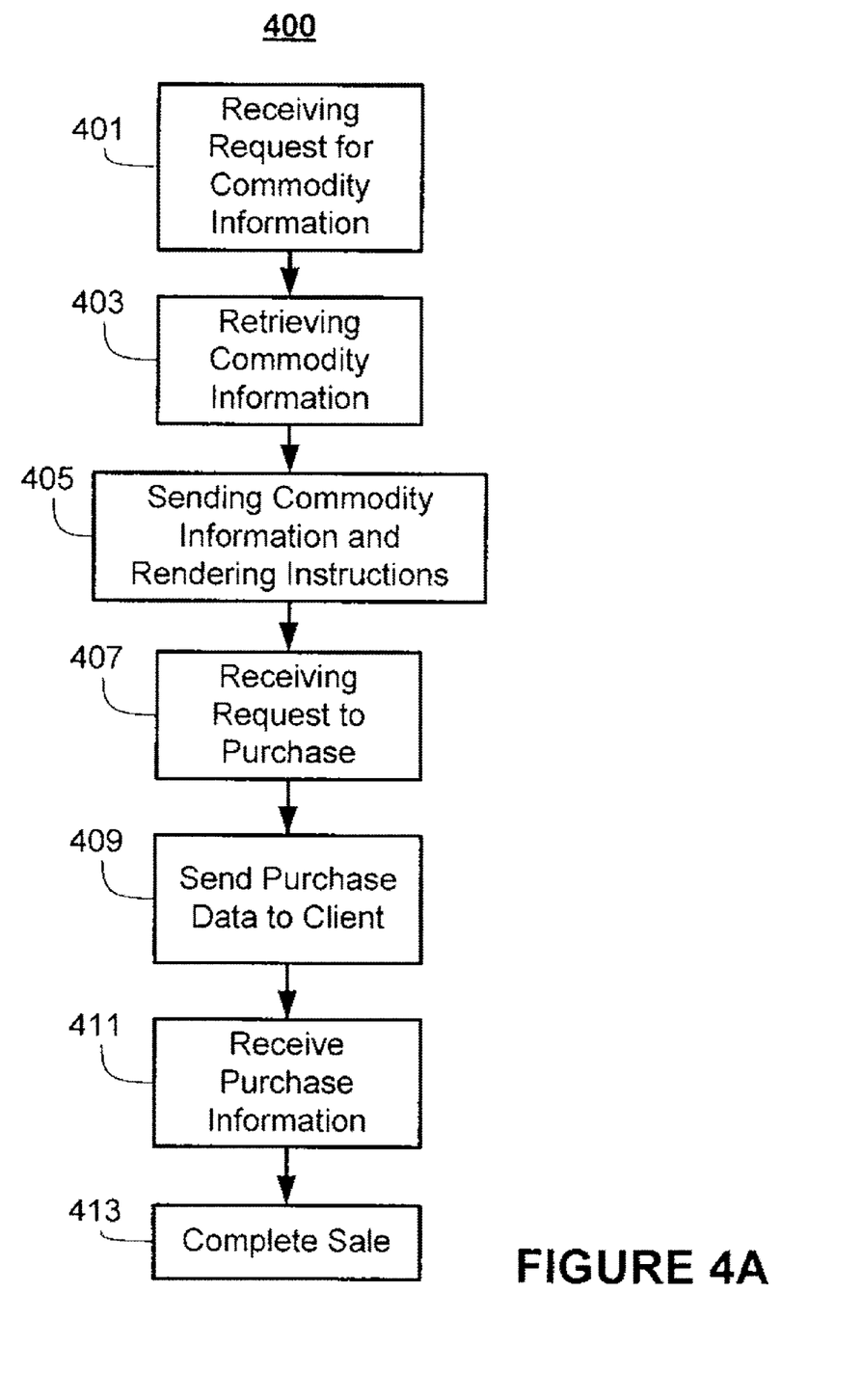
Figure 4B:
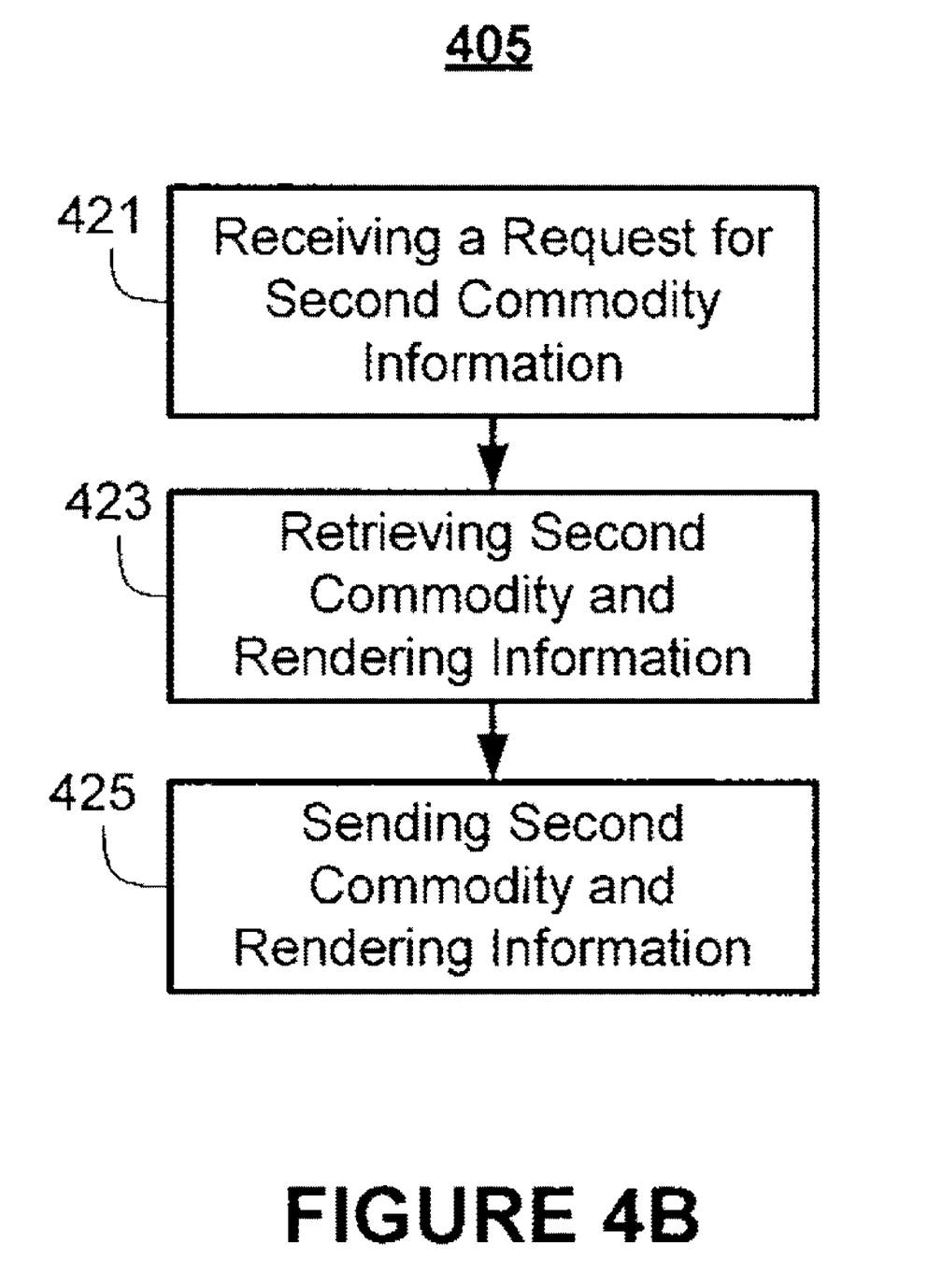

FIGS. 3-4B are flowcharts illustrating example methods according to one embodiment. Referring first to FIG. 3, example method 300 of purchasing a commodity from a merchant is illustrated. At step 301, a request for commodity information is sent to a server computer. The request may be generated when, for example, a consumer accesses a merchant website or other type of e-commerce portal. Alternatively, the request may be generated after the consumer has navigated to an appropriate location of the merchant website. It should be noted that, for clarity, an embodiment that involves a merchant website is discussed herein, but all embodiments are not so limited.

The request may simply be for any information related to any commodities made available by the merchant, in which case the server has discretion to send virtually any information relating to the commodity it wishes, or the request may be for specific commodity information, in which case the server may be constrained by the request. Alternatively, the server may have some leeway to provide information that closely matches a consumer request if the request yields few or no results (e.g., if the consumer misspells a search parameter, or the like). The information provided by server may be, for example, a listing of commodities, commodity description, pictures, etc. The information may also include a representative image of the commodity. It will be appreciated that, in an embodiment, rather than providing an image of the exact commodity to be offered for sale, the representative image may be of the same type, model, etc., of the commodity such that the consumer is provided with a reasonable idea of the commodity's appearance.

In an embodiment, the representative image may be modified to more closely resemble the appearance of the commodity. For example, in an embodiment where the commodity is a diamond, the representative image may simply be of a diamond that is the same shape of the actual diamond. The representative image may be modified in color, size or the like to more closely resemble the actual diamond. In one embodiment, the representative image may be modified by the server and sent to the client computer in modified form. In another embodiment, the representative image may be sent to the client computer in its standard form with instructions or other parameters that indicate the proper modifications to be made to the representative image by the client computer.

At step 303, the commodity information is received by the client computer. It will be appreciated that the merchant may send additional information relating to display characteristics, i.e., the merchant may specify the appearance of the user interface, include additional graphics that are unrelated to the commodity, etc. The commodity information may also include rendering information. Such rendering information instructs client computer to display the commodity information in a particular way. For example, the rendering information may include graphics or display instructions.

Step 303 may also include the receipt of a software module (such as software module 215 discussed above in connection with FIG. 2) from the server. In an alternative embodiment, the software module may be sent to the client computer prior to step 301, such that step 301 is carried out by the software module. Method 300 may take place in accordance with techniques that are colloquially referred to as "Asynchronous" communication facilitated by established and accepted standards such as XML encapsulated with code, for example JavaScript. A software module that is being executed by the client computer may operate in a computing environment provided by, for example, ColdFusion® by Macromedia, Inc. of San Francisco, Calif. In an embodiment, the commodity information may be displayed using, for example, Flash®, also by Macromedia, Inc. of San Francisco, Calif. In such an embodiment, the software module may be instantiated for the user session with the server, and may provide asynchronous communication with the server. To ensure that use of an unauthorized software module or tampering with the delivered module does not occur, an embodiment may use a security checksum embodied in the communication stream that may be validated by the code executing on the server. Thus, a user interface may continue to be displayed while the software module simultaneously interacts with the server. In an embodiment using Flash® technology, it will be appreciated that the website may be presented to a user in a seamless continuum such as, for example, a digital movie.

At step 305, therefore, the received commodity information is displayed. Some details relating to the display of the commodity information are discussed below in connection with FIGS. 5-8B, which illustrate an example user interface in which the commodity information may be displayed. At step 307, an action of a user of the client computer is detected. The client action may be, for example, a request to view additional data with respect to a particular commodity. Alternatively, the consumer may wish to reorganize the results (if the results were a listing of commodities), start over or the like. The request may be in the form of a mouse click, text entry, or any other manner of input. At step 309, a determination is made at the client computer as to whether communication with the server is required in order to respond to the client action. Such a determination may be made by, for example, the software module.

If the determination of step 309 is that the server should be contacted, then at step 311 the server is contacted and information necessary to respond to the user action is ultimately received. If the determination of step 309 is that the server need not be contacted, then at step 313, the software module, in conjunction with the interface software of the client computer, responds to the action.

It will be appreciated that steps 309-313 may take place in accordance with techniques that are colloquially referred to as "Asynchronous communication facilitated by established and accepted standards such as XML encapsulated with code, for example JavaScript. Using such techniques, the software module may enable the user interface displayed on a display of the client computer to allow a certain level of user interaction with the commodity information displayed therein without the need for contacting the server. For example, if the commodity information includes a listing of numerous commodities, the user may decide to sort the commodities based on price, size, etc. Because the commodity information has already been received, all the client computer needs to do is rearrange the information in the desired manner. Thus, no new information is required of the server. Because an embodiment contacts the server only when new or additional information is required, server workload and bandwidth consumption may be reduced.

At step 315, a user request to purchase a commodity is detected. Such a request may be in the form of, for example, a user click on a link within a user interface to select a particular commodity for purchase. At step 317, the sale is completed. Step 317 may involve any number of intermediate steps, such as receiving purchase information from the server. The purchase information may include a form or the like for the consumer to fill out to complete the order. In addition, financial terms may be finalized, payment and delivery arranged, as applicable. Such financial terms may include financing, layaway provisions, etc.

FIG. 4A is a flowchart illustrating an example method 400 of selling a commodity according to one embodiment. It will be appreciated that, in some embodiments, method 400 reflects the actions taken by a server in response to a client computer (or a software component of such a client computer) performing method 300 of FIG. 3, as discussed above. For example, at step 401, a request for information relating to one or more commodities is received from a client computer. The request may be as discussed above in connection with step 301 of FIG. 3.

At step 403, the requested commodity information is retrieved. As was noted above in connection with step 303 of FIG. 3, the commodity information may match a client request exactly, or the server may have some leeway to present additional or different information to the client. For example, if the requested information is not present, but closely matching information is available, the closely matching information may be provided.

At step 405, the requested commodity information and rendering instructions are sent to the client. Steps 401-405 may be repeated any number of times as the consumer reviews and compares commodities, selects different commodities, etc. In addition, a software module may be sent to the client computer at step 405. Alternatively, the software module may be sent to the client computer prior to step 401. At step 407, a request to purchase a commodity may be received. At step 409, purchase data is sent to the consumer. The purchase data may include a form or the like that may be designed to solicit consumer purchase information for completion of the order such as, for example, name, address, payment information, delivery information and so forth. In one embodiment, the consumer may have an account with the merchant associated with the server, in which case purchase data may comprise a prompt for a consumer identification and password. In an embodiment where the consumer is already known to the server, either through previous usage, password, security token or the like, such purchase data need not be sent to the consumer. In embodiments where such purchase data is sent to a consumer, therefore, at step 411 purchase information is received from the consumer. At step 413, the sale is completed. In an embodiment, final completion of the sale such as, for example, delivery of the commodity may take place at some time after step 413.

FIG. 4B is a flowchart illustrating an expanded view of step 405, in an embodiment where a consumer desires to view at least two commodities that are functionally related. "Functionally related," as used herein, refers to commodities that may be used together or have some relationship to each other. In the case of jewelry, for example, a first commodity may be a diamond, and a second commodity may be a setting, such as a ring, necklace, earrings, etc. Thus, an embodiment provides a mechanism for enabling a consumer to select, configure and purchase two or more related commodities.

At step 421, a request for second commodity information is received. As noted above, in the context of diamonds the second commodity may be a setting, and therefore the second commodity information may be information describing one or more settings. The information may include a representative image of the setting.

At step 423, the second commodity information is retrieved from, for example, a data repository or the like. Such commodity information may be stored with the first commodity information, or may stored in another memory location. In addition, the inventory for the second commodity may be maintained in the "virtual" manner discussed above, in a traditional manner, or the like. At step 425, the second commodity information and any rendering information is sent to the client for display and consumer interaction.

FIGS. 5-8B are illustrations of an example consumer interface 500 according to one embodiment of the invention. While FIGS. 5-8B are illustrated in the context of a user purchase of a loose diamond and a corresponding setting, it will be appreciated that an embodiment is not so limited. Rather, embodiments contemplate the sale of any type of commodity or commodities.

Figure 5:
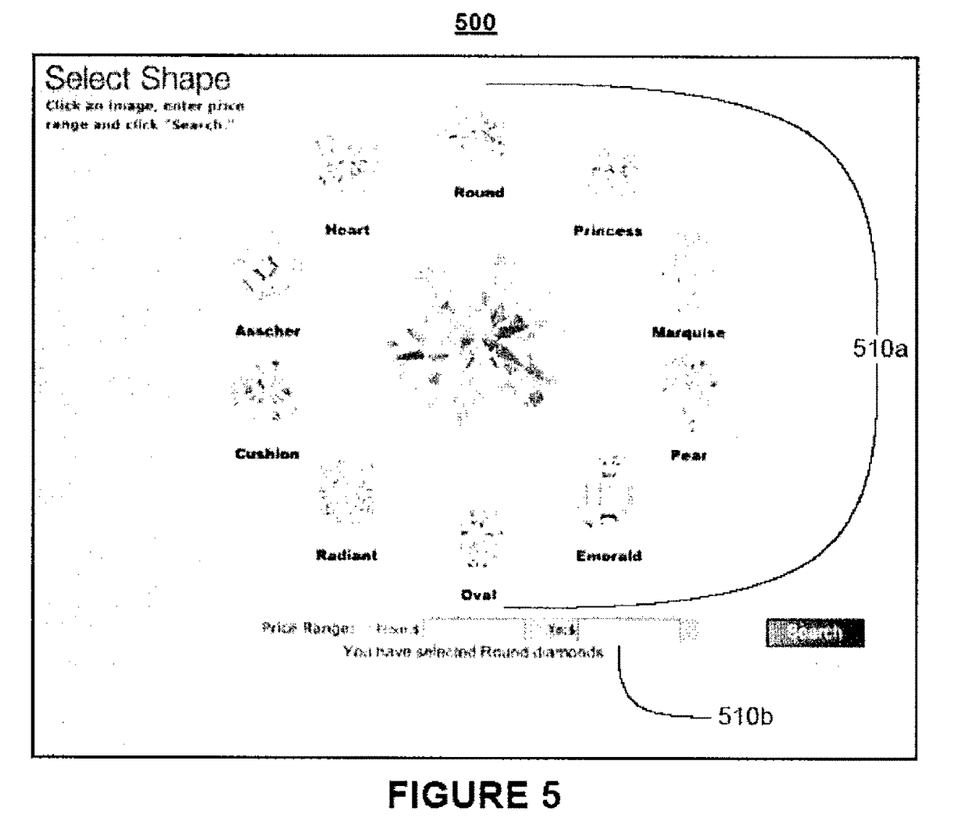

FIG. 5 provides an illustration of an example user interface 500 to be displayed to a consumer. User interface 500 may be part of, for example, an interne browser window, or may be a stand-alone application. User interface 500 may also be part of a web page that is displayed by an interne browser. In one embodiment, user interface 500 may be presented as a digital movie enabled by Flash® technology, as was discussed above.

In FIG. 5, it can be seen that commodity information 510a relates to diamond shape, while commodity information 510b relates to price. Thus, in one embodiment, a consumer may search a merchant's inventory of diamonds by selecting the desired diamond shape (round is shown in FIG. 5), along with a desired price range.

Figure 6:
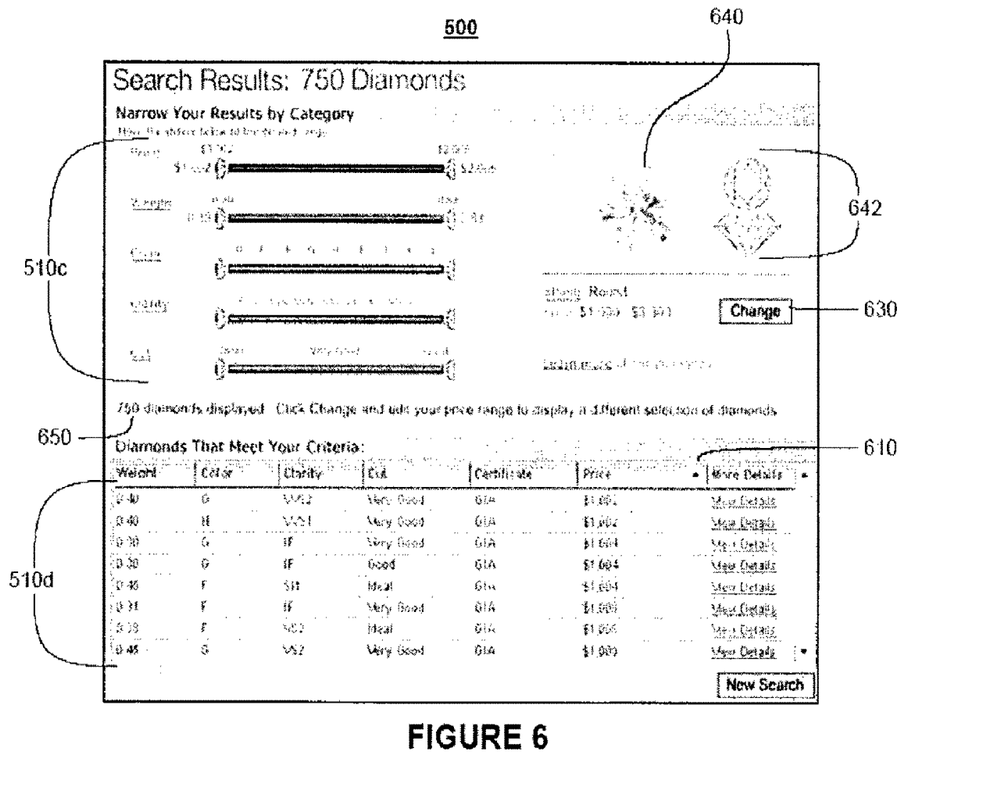

Referring now to FIG. 6, user interface 500 is illustrated as having returned a search result. Commodity information 510c provides additional selection criteria for searching within the presented results 510d. In an alternative embodiment, commodity information 510c may enable a consumer to select an entirely new search. It can be seen in FIG. 6 that commodity information 510c provides sliders that enable a user to select subsets of the search results by moving either (or both) ends of each slider, where each slider corresponds to a characteristic of the diamonds. While sliders are illustrated in FIG. 6, user interface 500 may provide any means for selecting subsets of search results.

An embodiment may strike a balance between providing complete results to a consumer without overwhelming the consumer's computer with too many results. Thus, a limit may be set by the merchant's server on the total number of results that may be passed to the consumer's computer. Such a limit may be set based on any number or type of factors. For example, the limit may be set arbitrarily, dynamically based on a detected feature of the consumer's computer, or the like. In FIG. 6, message 650 indicates that results 510d are limited to 750 diamonds.

User interface 500 also includes representative image 640. Representative image 640, as discussed above, may be an image of a diamond that has characteristics that are common to that of a selected diamond. Representative image may be displayed life-size, may be enlarged to show details, and so forth. In addition, user interface provides diagram 642 that visually conveys additional information regarding the diamond. User interface 500 also includes sortable attributes 610, which enable a user to sort search results 510d according to a field the consumer deems most relevant, for example weight. Change button 630 allows the consumer to restart the inquiry using new search values for shape and price, for example.

It will be appreciated that selecting subsets of the search results do not, in an embodiment, require the consumer computer to contact the merchant server for additional information. For example, if the consumer wants to sort the search results on "color," by selecting the appropriate sortable attributes 610, the consumer's computer need only resort the results that have already been downloaded from the server. Thus, the sort operation may take place without contacting the server. Likewise, selecting a subset of the search results using the sliders may also take place without contacting the server. Thus, an embodiment minimizes contact with the server to occasions where new information needs to be obtained.

Figure 7:
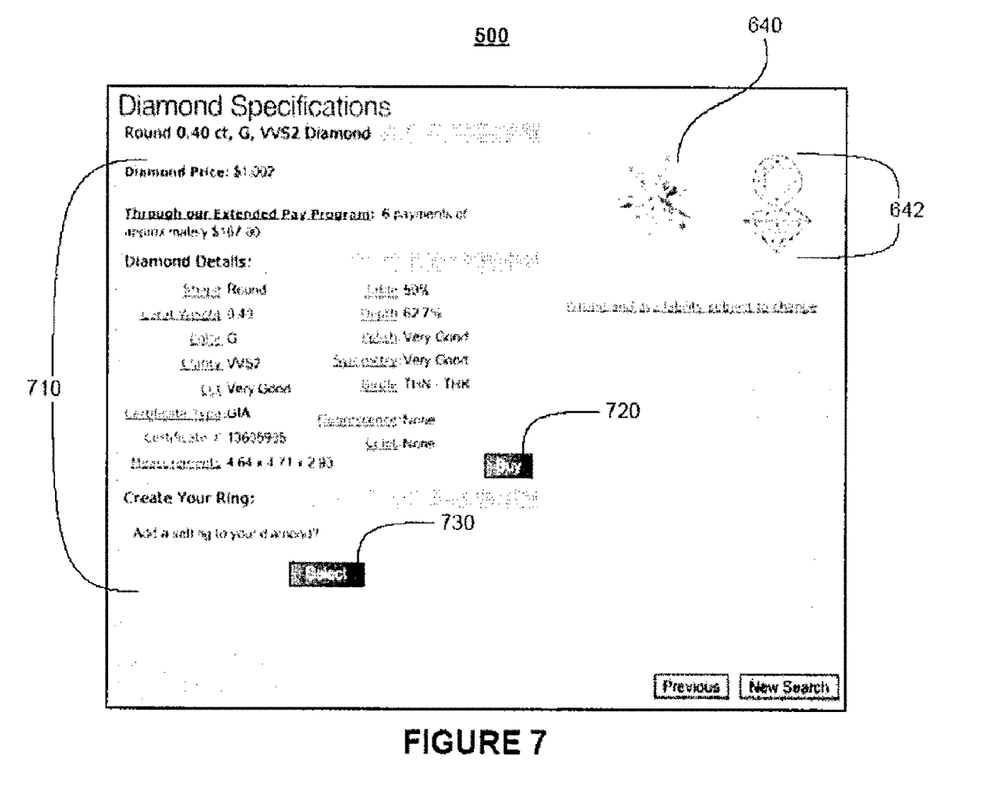

Referring now to FIG. 7, user interface 500 is shown as displaying an example detail view that may be presented once a diamond has been selected. For example, detailed commodity information 710 may provide information that is specific to the selected diamond. Representative image 640 and diagram 642 may also be provided. Furthermore, a buy button 720 may be provided to initiate a consumer purchase of the diamond. Button 730 provides an opportunity for a consumer to select a second commodity, in this example a setting, which may be purchased along with the diamond. It will be appreciated that buttons 720 and 730 are provided for purposes of illustration, as any type of selection mechanism may be provided.

Figure 8A:
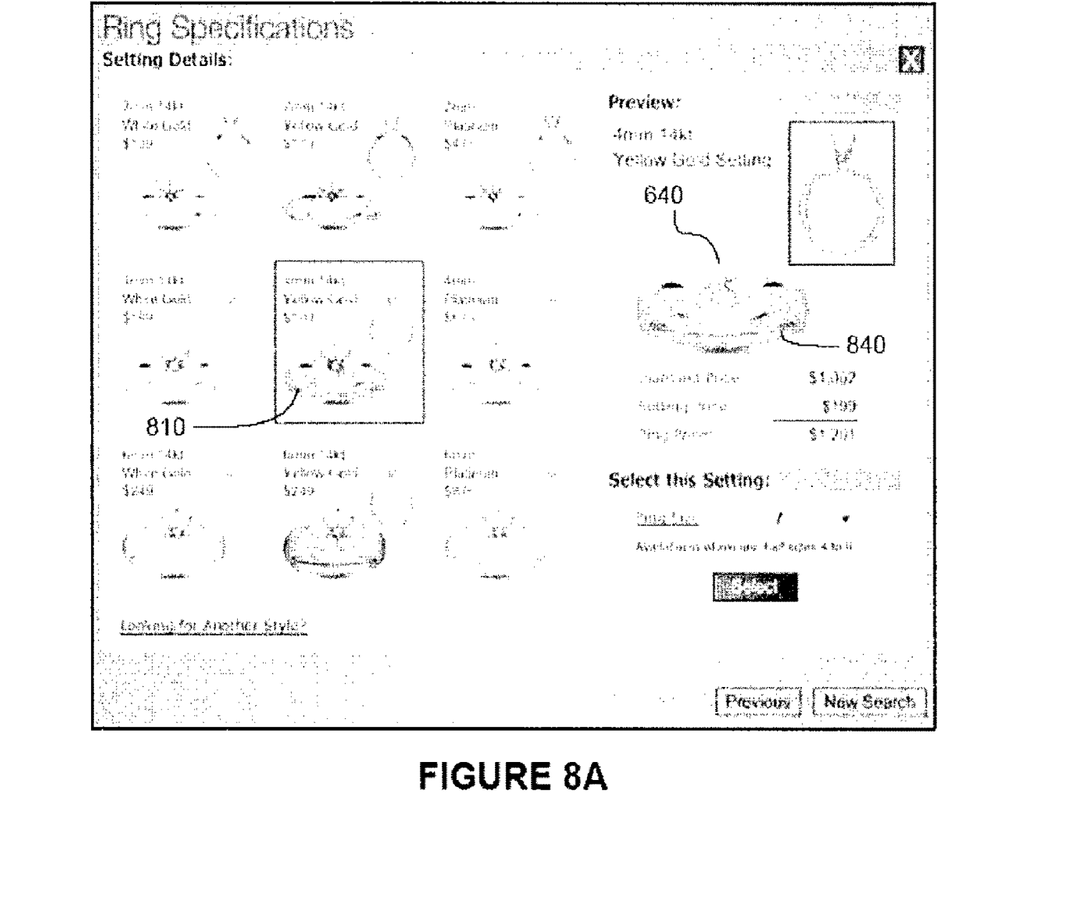
Figure 8B:
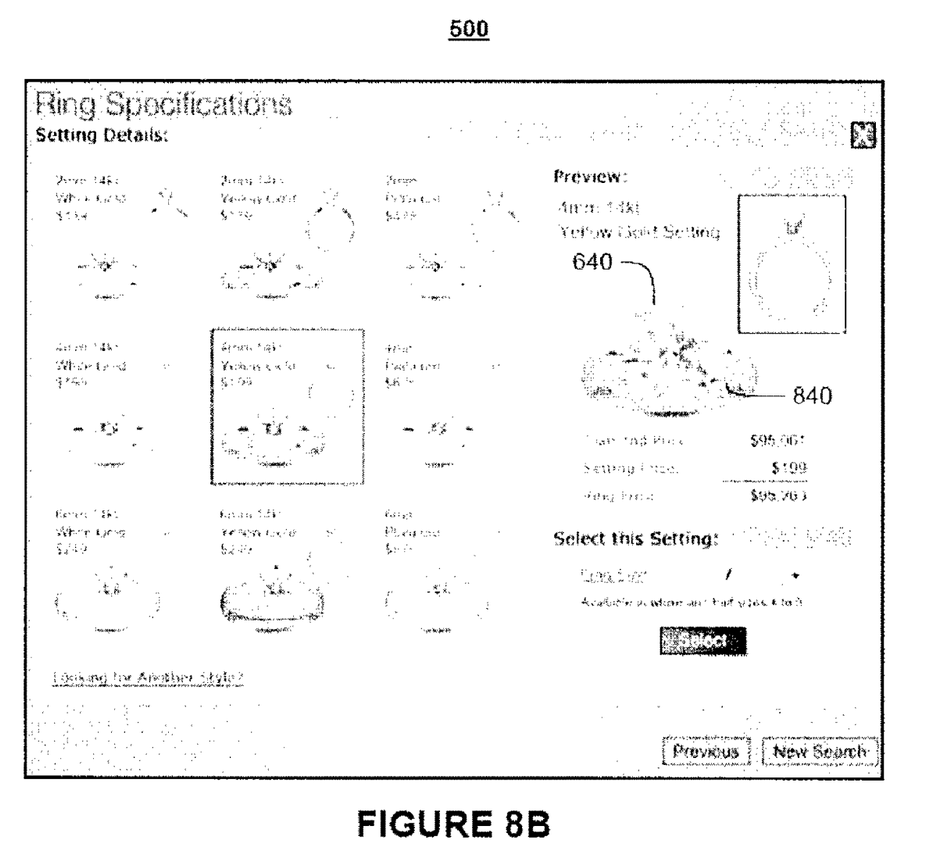

FIG. 8A illustrates the relationship between two commodities, in this example a diamond and a setting. Second commodity information 810 shows a selection of settings from which the consumer may select a setting to which the selected diamond may be mounted. Representative image 640 of the diamond is shown in a scaled form to illustrate the relative size of the diamond to the setting, as illustrated in representative image 840. FIG. 8B illustrates representative image 640 when a much larger diamond has been selected for mounting to the setting, which is represented by representative image 840. As can be seen, the diamonds illustrated by representative image 640 are illustrated differently in each figure to demonstrate the relative size of the diamond with respect to its setting. Alternatively, the size of representative image 840, or both images 640 and 840, may be changed to demonstrate their relative sizes. FIGS. 8A-B demonstrate an example where the relative size of two commodities (a diamond and a setting) are deemed to be an appropriate visual aid. It will be appreciated that other commodities that are functionally related in other ways may be illustrated so as to demonstrate some other relationship between the commodities.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the appended claims.

What is claimed:

1. A computer implemented method comprising:
using a processor in a system including at least one subsystem having a computing device with the processor and memory for storing executable instructions that are executable by the processor to perform:
  receiving, at a server computer, a request for information relating to a first commodity that is available for purchase by a consumer from a consumer computer via a first merchant, wherein the first merchant owns the first commodity;
  sending a software module that is adapted for asynchronous communication with the server to the consumer computer;
  sending a predetermined amount of the requested information to the software module at the consumer computer, wherein the information includes a first commodity description of the first commodity;
  sending a predetermined amount of unrequested information to the software module at the consumer computer, wherein the unrequested information includes a second commodity description of a second commodity and instructions for rendering the descriptions on a display of the consumer computer, wherein a second merchant owns the second commodity and wherein sending the requested information and sending the unrequested information includes providing to the consumer the information relating to the first commodity and the information relating to the second commodity such that the consumer is not informed of merchant ownership of the first commodity and the second commodity;
  receiving a consumer request to interact with the requested and unrequested information;
  allowing a predetermined amount of consumer interaction with the requested and unrequested information;
  detecting a consumer action with respect to the requested and unrequested information; and
  determining, using the software module, whether communication with the server computer is required to respond to the consumer action and, responsive to a determination that communication is not required, responding to the consumer action without communicating with the server computer regarding the response.

2. The method of claim 1, wherein the rendering instructions comprise a representative image of the first commodity and the second commodity.

3. The method of claim 2, wherein the representative images are rendered according to the commodity descriptions.

4. The method of claim 1, wherein the asynchronous communication of the software module facilitates communications with the server while simultaneously rendering the descriptions on the display.

5. The method of claim 1, wherein the first commodity description comprises a listing of a plurality of commodities that satisfy a consumer-specified criterion.

6. The method of claim 5, wherein, if a number of commodities that satisfy the consumer-specified criterion exceeds a predetermined threshold, the plurality of commodities in the listing are limited to the threshold number, and wherein the rendering instructions comprise an indication of the number of commodities that satisfy the consumer-specified criterion.

7. The method of claim 1, further comprising instructions that are executable by the processor to perform:
- receiving, from the module, a consumer request to purchase a commodity selected from the group consisting of the first commodity, the second commodity, and combinations thereof;
- sending purchase data to the module; and
- receiving, from the module, purchase information from the consumer and completing the purchase.

8. The method of claim 1, wherein the first commodity is a diamond.

9. The method of claim 8, wherein the first commodity information comprises one of: diamond shape, price, weight, color, clarity and cut.

10. The method of claim 1, wherein the request is a first request, and further comprising instructions that are executable by the processor to perform
- receiving, at the server computer, a second request for information relating to a third commodity that is functionally associated with the first commodity from the software module; and
- sending the information relating to the third commodity to the module, wherein the information comprises a description of the third commodity and instructions for rendering the description of the third commodity on the display of the consumer computer such that a functional relationship between the first and third commodities is illustrated.

11. The method of claim 10, wherein the first commodity is a diamond and the third commodity is a setting.

12. A computer-readable storage medium having computer-executable instructions, said computer-executable instructions comprising instructions for:
- receiving, at a server computer, request for information relating to a first commodity that is available for purchase by a consumer from a consumer computer via a first merchant, wherein the first merchant owns the first commodity;
- sending a software module that is adapted for asynchronous communication with the server to the consumer computer, wherein the software module can detect a consumer action, determine whether communication with the server computer is required in order to respond to the consumer action, and, if the communication is not necessary, respond to the consumer action without communicating with the server computer regarding the response;
- sending a predetermined amount of the requested information to the software module at the consumer computer, wherein the information includes a first commodity description of the first commodity; and
- sending a predetermined amount of unrequested information to the software module at the consumer computer, wherein the unrequested information includes a second commodity description of a second commodity and instructions for rendering the descriptions on a display of the consumer computer, wherein a second merchant owns the second commodity and wherein sending the requested information and sending the unrequested information includes providing to the consumer the information relating to the first commodity and the information relating to the second commodity such that the consumer is not informed of merchant ownership of the first commodity and the second commodity;
- receiving a consumer request to interact with the requested and unrequested information; and
- allowing a predetermined amount of consumer interaction with the requested and unrequested information;
- wherein the predetermined amount of consumer interaction does not require communication with the server computer.

13. The computer-readable storage medium of claim 12, wherein the rendering instructions comprise a representative image of the first commodity and the second commodity.

14. The computer-readable storage medium of claim 13, wherein the representative images are rendered according to the commodity descriptions.

15. The computer-readable storage medium of claim 12, wherein the asynchronous communication of the software module facilitates communications with the server while simultaneously rendering the description on the display.

16. The computer-readable storage medium of claim 12, wherein the first commodity description comprises a listing of a plurality of commodities that satisfy a consumer-specified criterion.

17. The computer-readable storage medium of claim 16, wherein, if a number of commodities that satisfy the consumer-specified criterion exceeds a predetermined threshold, the plurality of commodities in the listing are limited to the threshold number, and wherein the rendering instructions comprise an indication of the number of commodities that satisfy the consumer-specified criterion.

18. The computer-readable storage medium of claim 12, further comprising computer-executable instructions for:
- receiving, from the module, a consumer request to purchase a commodity selected from the group consisting of the first commodity, the second commodity, and combinations thereof;
- sending purchase data to the module; and
- receiving, from the module, purchase information from the consumer and completing the purchase.

19. The computer-readable storage medium of claim 12, wherein the first commodity is a diamond.

20. The computer-readable storage medium of claim 19, wherein the first commodity information comprises one of: diamond shape, price, weight, color, clarity and cut.

21. The computer-readable storage medium of claim 12, wherein the request is a first request, and further comprising computer-executable instructions for:
- receiving, at the server computer, a second request for information relating to a third commodity that is functionally associated with the first commodity from the software module; and
- sending the information relating to the third commodity to the module, wherein the information comprises a description of the third commodity and instructions for rendering the description of the third commodity on the display of the consumer computer such that a functional relationship between the first and third commodities is illustrated.

22. The computer-readable storage medium of claim 21, wherein the first commodity is a diamond and the third commodity is a setting.

23. A system comprising one or more computing devices comprising a processor and a memory that are configured to:
- receive, at a server computer, a request for information relating to a first commodity that is available for purchase by a consumer from a consumer computer via a first merchant, wherein the first merchant owns the first commodity;

send a software module executing on the one or more computing devices that is adapted for asynchronous communication with the server to the consumer computer;

send a predetermined amount of requested information to the software module at the consumer computer, wherein the information includes a first commodity description of the first commodity;

send a predetermined amount of unrequested information to the software module at the consumer computer, wherein the unrequested information includes a second commodity description of a second commodity and instructions for rendering the descriptions on a display of the consumer computer, wherein a second merchant owns the second commodity and wherein sending the requested information and sending the unrequested information includes providing to the consumer the information relating to the first commodity and the information relating to the second commodity such that the consumer is not informed of merchant ownership of the first commodity and the second commodity;

receive a consumer request to interact with the requested and unrequested information;

allow a predetermined amount of consumer interaction with the requested and unrequested information;

detect a consumer action with respect to the requested and unrequested information; and determine, using the software module, whether communication with the server computer is required to respond to the consumer action and, if the communication is not necessary, responding to the consumer action without communicating with the server computer regarding the response.

24. The system of claim 23, wherein the rendering instructions comprise a representative image of the first commodity and the second commodity.

25. The system of claim 24, wherein the representative images are rendered according to the commodity descriptions.

26. The system of claim 23, wherein the asynchronous communication of the software module facilitates communications with the server while simultaneously rendering the description on the display.

27. The system of claim 23, wherein the first commodity description comprises a listing of a plurality of commodities that satisfy a consumer-specified criterion.

28. The system of claim 27, wherein, if a number of commodities that satisfy the consumer-specified criterion exceeds a predetermined threshold, the plurality of commodities in the listing are limited to the threshold number, and wherein the rendering instructions comprise an indication of the number of commodities that satisfy the consumer-specified criterion.

29. The system of claim 23, further comprising at least one subsystem executing on the one or more computing devices that:

receives, from the module, a consumer request to purchase a commodity selected from the group consisting of the first commodity, the second commodity, and combinations thereof;

sends purchase data to the module; and receives, from the module, purchase information from the consumer and completing the purchase.

30. The system of claim 23, wherein the first commodity is a diamond.

31. The system of claim 30, wherein the first commodity information comprises one of: diamond shape, price, weight, color, clarity and cut.

32. The system of claim 23, wherein the commodity is a first commodity and the request is a first request, and further comprising at least one subsystem executing on the one or more computing devices that:

receives, at the server computer, a second request for information relating to a third commodity that is functionally associated with the first commodity from the software module; and sends the information relating to the third commodity to the module, wherein the information comprises a description of the third commodity and instructions for rendering the description of the third commodity on the display of the consumer computer such that a functional relationship between the first and third commodities is illustrated.

33. The system of claim 32, wherein the first commodity is a diamond and the third commodity is a setting.

* * * * *